Figure 1:
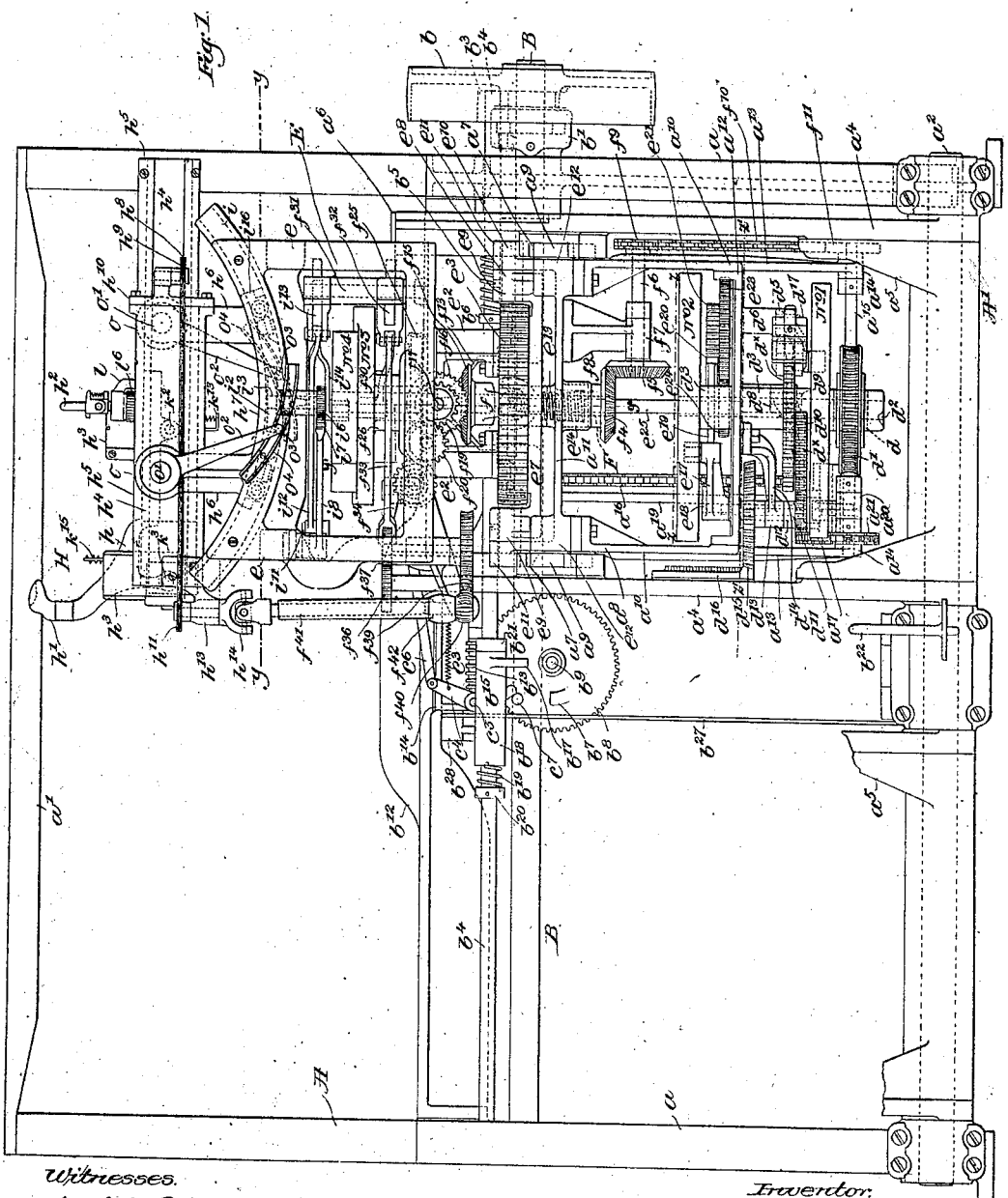

E. E. WINKLEY.
AUTOMATIC JACK.
APPLICATION FILED SEPT. 14, 1898.

1,054,733.

Patented Mar. 4, 1913.
10 SHEETS—SHEET 1.

Witnesses.

Inventor.
Erastus E. Winkley

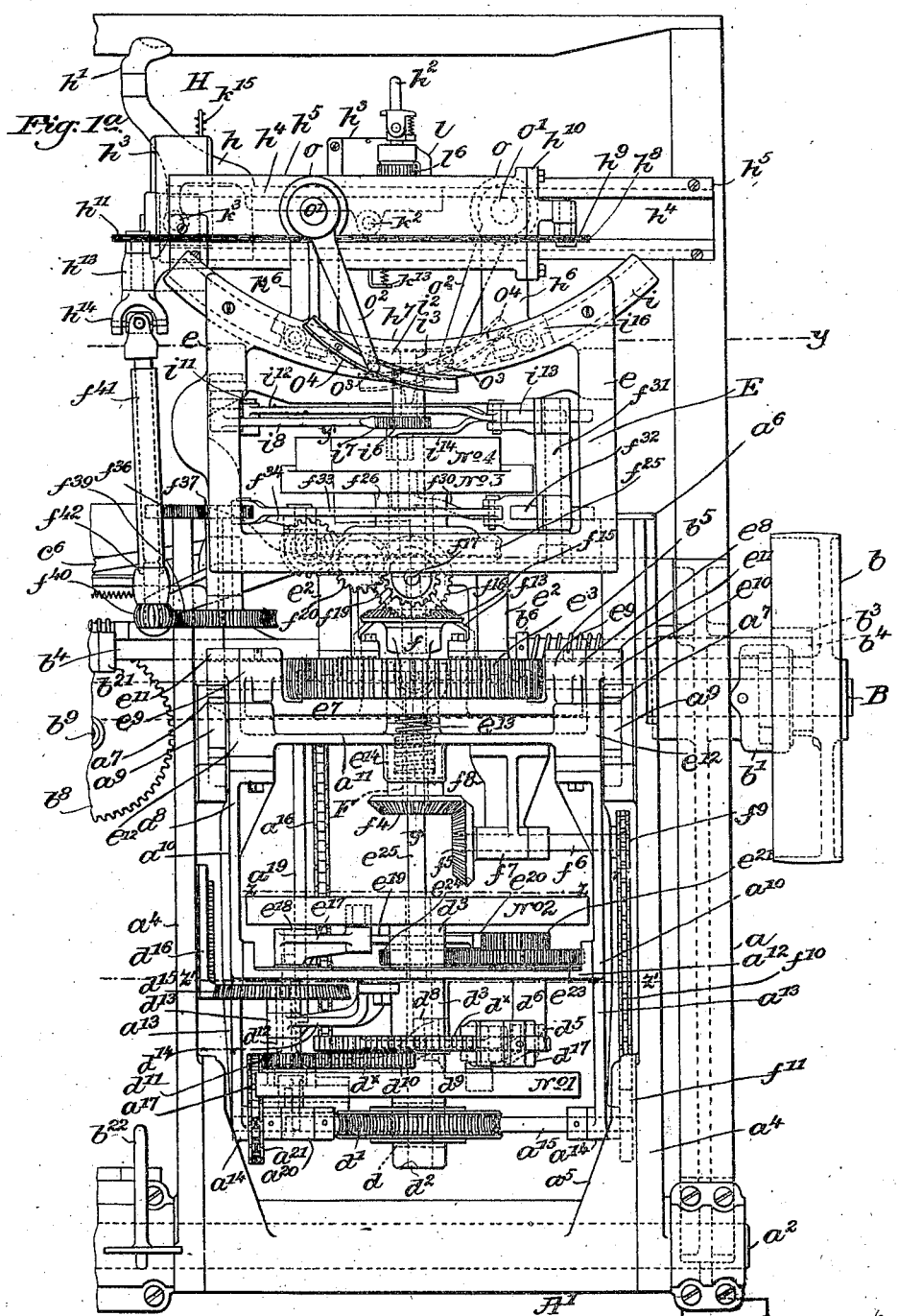

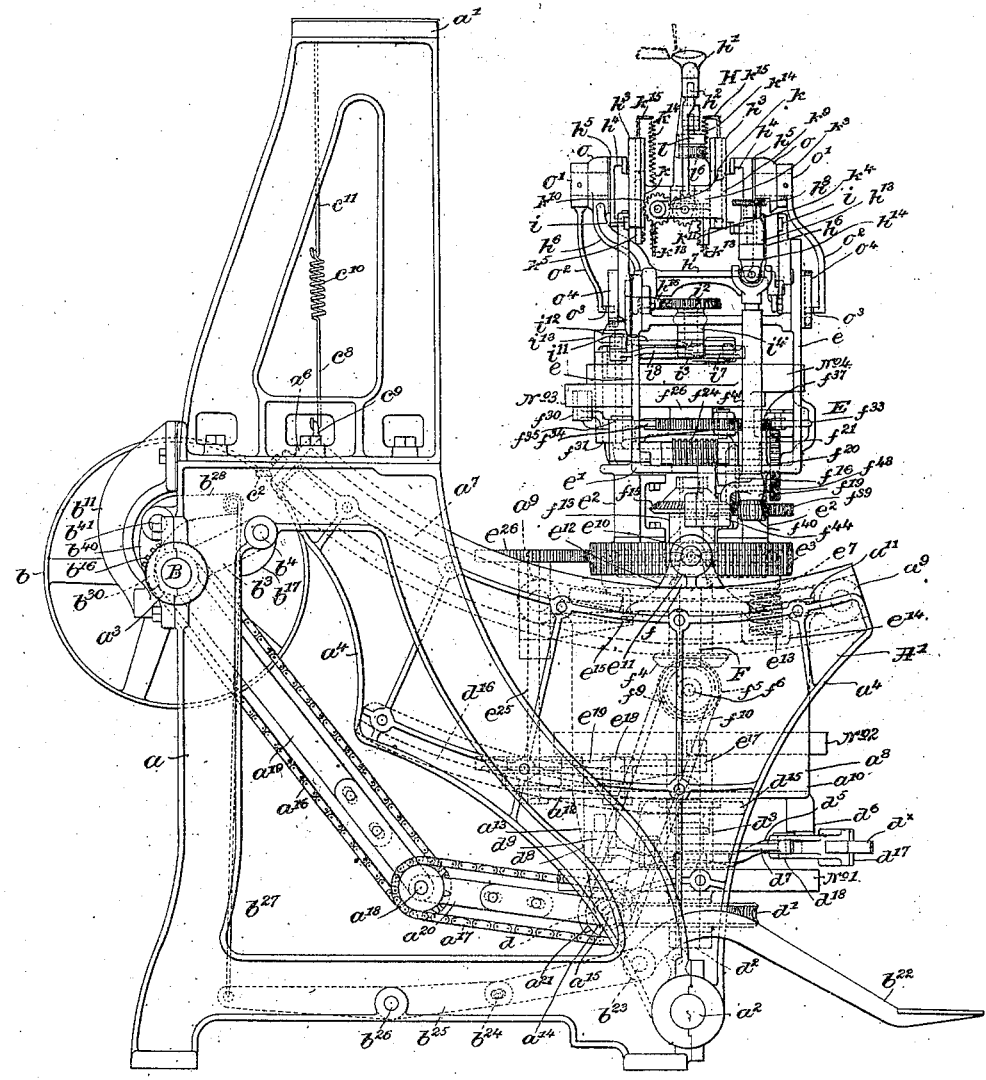

E. E. WINKLEY.
AUTOMATIC JACK.
APPLICATION FILED SEPT. 14, 1898.
1,054,733.
Patented Mar. 4, 1913.
10 SHEETS—SHEET 4.
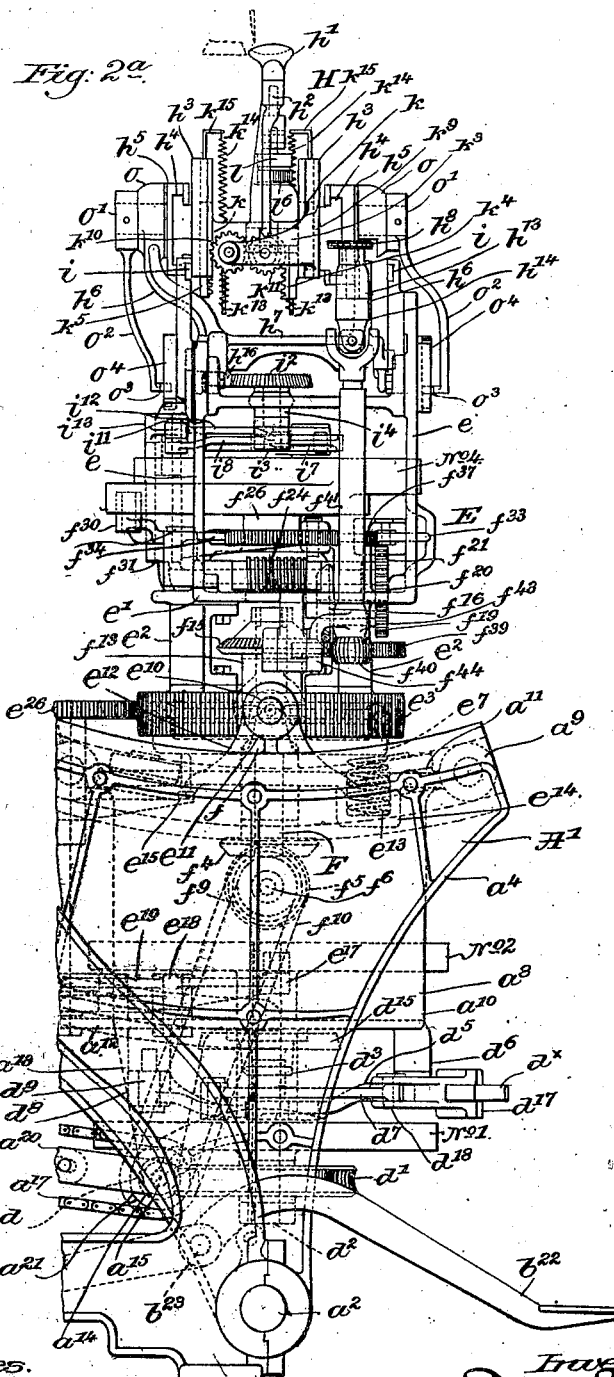

E. E. WINKLEY.
AUTOMATIC JACK.
APPLICATION FILED SEPT. 14, 1898.
1,054,733.
Patented Mar. 4, 1913.
10 SHEETS—SHEET 5.
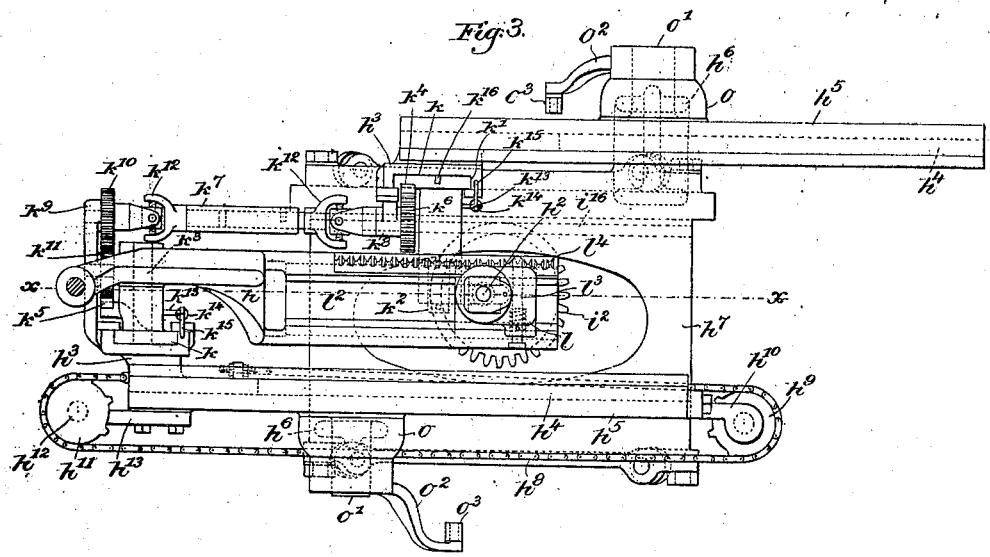
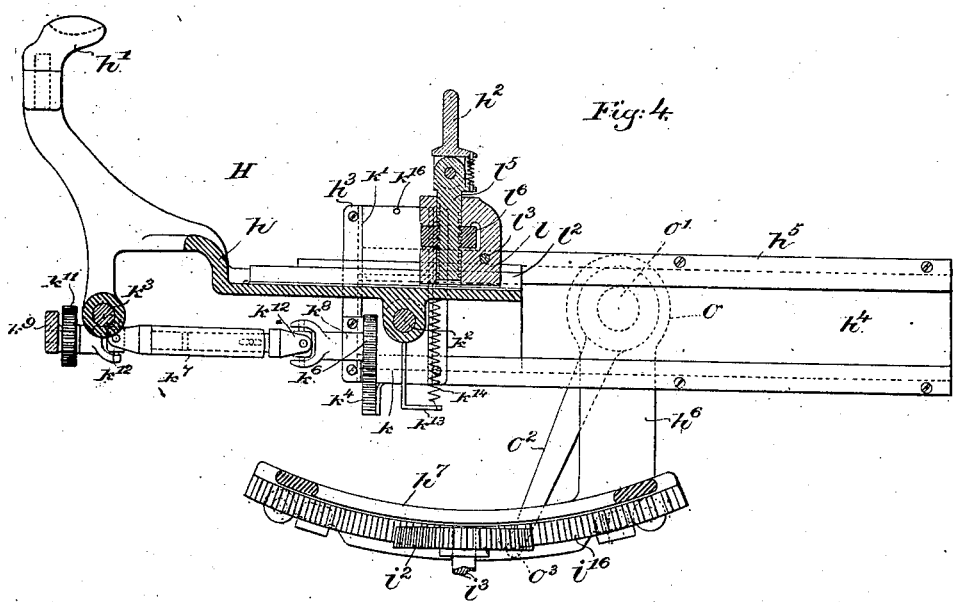
Witnesses.
Inventor:
Erastus E. Winkley
by Phillips & Anderson
Attys.

E. E. WINKLEY.
AUTOMATIC JACK.
APPLICATION FILED SEPT. 14, 1898.
1,054,733.
Patented Mar. 4, 1913.
10 SHEETS—SHEET 6.
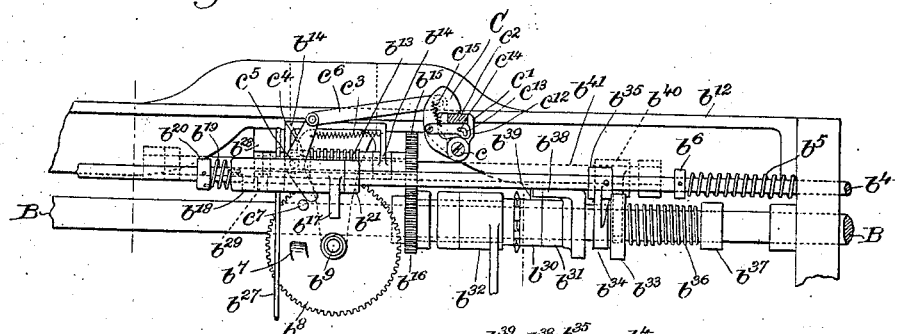
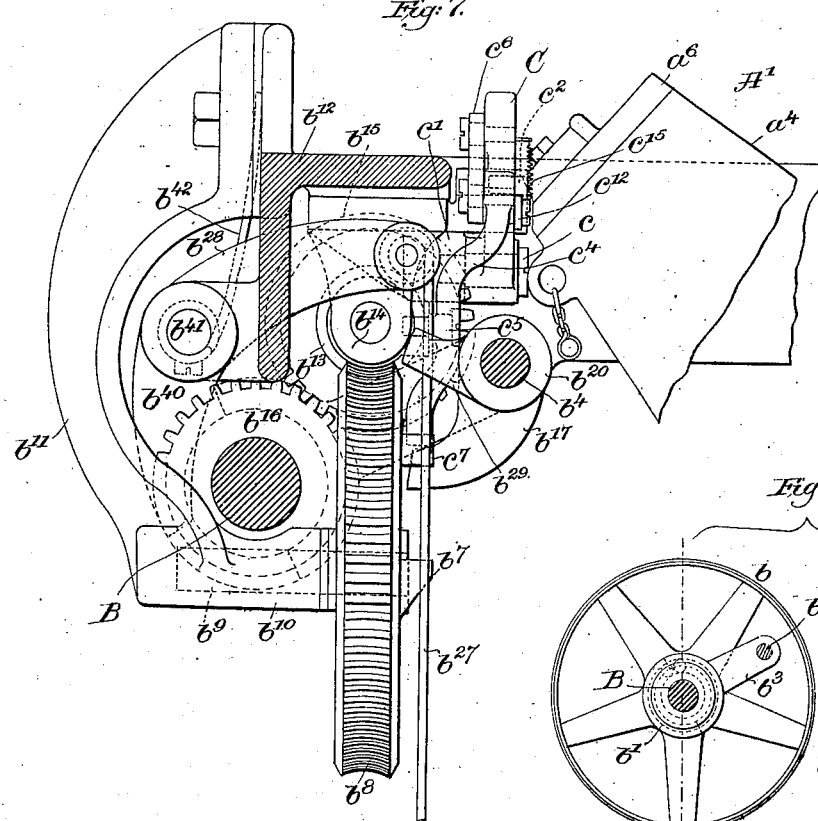
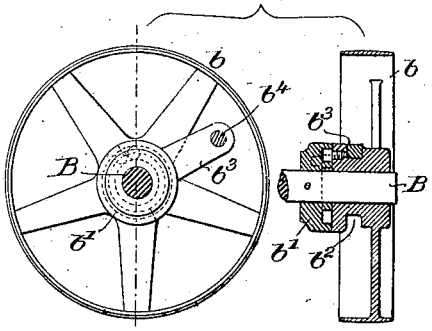
Witnesses.
Inventor.
Erastus E. Winkley.

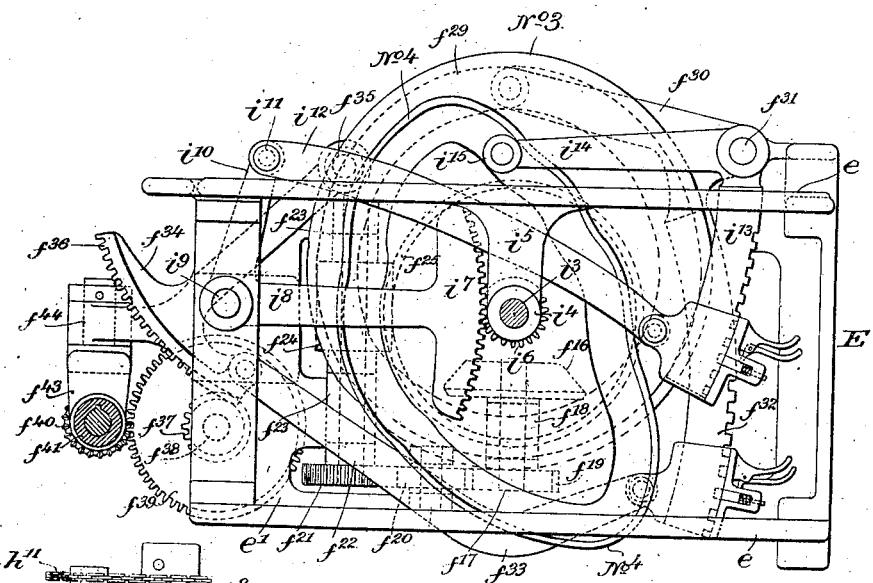

E. E. WINKLEY.
AUTOMATIC JACK.
APPLICATION FILED SEPT. 14, 1898.

1,054,733.

Patented Mar. 4, 1913.
10 SHEETS—SHEET 8.

Witnesses:
Inventor:
Erastus E. Winkley

E. E. WINKLEY.
AUTOMATIC JACK.
APPLICATION FILED SEPT. 14, 1898.

1,054,733.

Patented Mar. 4, 1913
10 SHEETS—SHEET 9.

Witnesses:

Inventor:
Erastus E. Winkley
by Phillips & Anderson
Attys.

E. E. WINKLEY.
AUTOMATIC JACK.
APPLICATION FILED SEPT. 14, 1898.
1,054,733.
Patented Mar. 4, 1913.
10 SHEETS—SHEET 10.
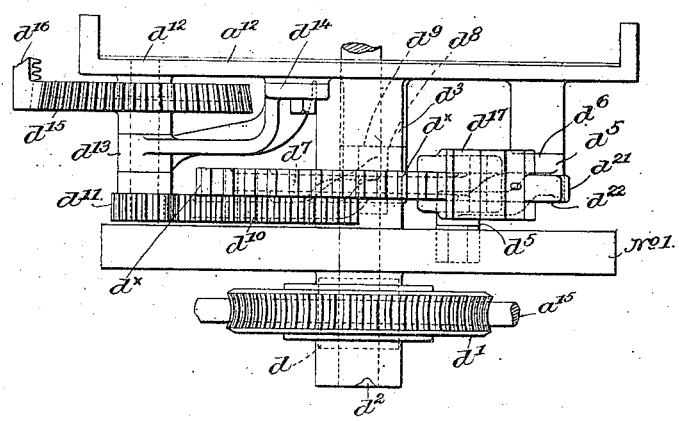
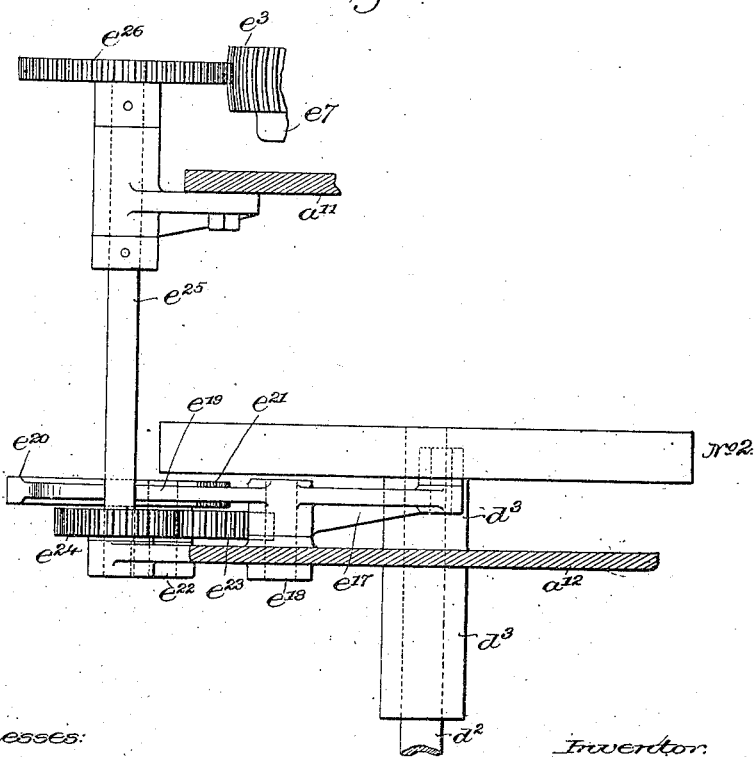
Witnesses:
John F. C. Frankfort
C. Nitching.
Inventor:
Erastus E. Winkley
by Phillips & Anderson

UNITED STATES PATENT OFFICE.

ERASTUS E. WINKLEY, OF LYNN, MASSACHUSETTS.

AUTOMATIC JACK.

1,054,733.　　　　Specification of Letters Patent.　　Patented Mar. 4, 1913.

Application filed September 14, 1898. Serial No. 690,934.

*To all whom it may concern:*

Be it known that I, ERASTUS E. WINKLEY, a citizen of the United States, residing at Lynn, in the county of Essex and State of Massachusetts, have invented certain new and useful Improvements in Automatic Jacks; and I do hereby declare the following to be a full, clear, and exact description of the invention, such as will enable others skilled in the art to which it appertains to make and use the same.

The present invention relates to boot and shoe machinery and more particularly to a jack arranged to support and properly position a shoe, with relation to various instrumentalities of a machine used in manufacturing and finishing shoes.

The object of the present invention is to produce a shoe supporting jack, which will support the shoe in proper relation to the nozzle, tool or tools, or other instrumentalities of machines such as pegging machines, sewing machines or sole edge finishing machines, and to provide means for actuating the jack to automatically position the shoe in proper relation to the tools or other instrumentalities of such machines as the point of operation of the tool or other instrumentalities is transferred around the shoe. In order to position the shoe in proper relation to the tool of such machines, it is necessary to impart to the jack lateral rocking movements to bring the bottom of the last or shoe sole into the desired plane transversely of the last, longitudinal tilting movements to bring the bottom of the last or shoe sole into the desired plane longitudinally of the last and lateral swinging movements to bring the portion of the edge of the last or shoe sole in proximity with the tool into a position parallel to the line of feed. These are the movements imparted to a lasted shoe in the hands of an operator in being presented to the tool or other instrumentalities of a machine of the character above referred to such as a shoe sewing or a rounding and channeling machine.

My invention contemplates providing means for automatically actuating a shoe supporting jack to impart these movements to a shoe supported thereon, the lateral rocking and longitudinal tilting movements taking place about a center substantially coincident with the point of operation of the tool.

So far as I am advised as to the state of the art it is new to provide means for automatically actuating a shoe supporting jack to impart to a shoe supported thereon lateral swinging movements to bring the edge of the last or shoe sole in proximity to the tool into a position parallel to the line of feed, or lateral rocking or longitudinal tilting movements about a center substantially coincident with the point of operation of the tool to bring the bottom of the last or shoe sole into the desired plane. My invention is therefore not limited to a jack provided with actuating means to impart all of these movements to a shoe supported thereon, but as to its broader features may be embodied in a jack provided with actuating means to impart one or more of these movements to a shoe supported thereon.

In the preferred form of my invention, mechanism is provided for actuating the jack to transfer the point of operation of the tool around the shoe, and this mechanism is connected to and combined with the mechanism for imparting the movements, above referred to, to the jack so that the jack is moved at the proper times during the transfer of the point of operation of the tool around the shoe to bring the shoe into the proper position with relation to the tool.
By providing mechanism for actuating the jack to transfer the point of operation of the tool around the shoe any possibility of the timed relation between the shoe and the mechanism for actuating the jack to bring the shoe into the proper position with relation to the tool being altered is avoided. It is to be understood, however, that as to its broader features my invention is not limited to a construction in which mechanism for actuating the jack to transfer the point of operation of the tool around the shoe is provided, but the point of operation of the tool may be otherwise transferred around the shoe, as, for instance, by the feeding devices of the machine on which the jack is used. In this connection I desire to state that the machine in which I have embodied the features of invention above referred to, is the first machine, so far as I am advised, in which the jack is constrained to move about the point of operation of the tool as a center when rocked laterally or tilted longitudinally to bring the sole into the desired plane as the point of operation of the tool is transferred around the shoe.

I accordingly consider a feature of my invention to consist in providing means for so supporting a jack that the lateral rocking or longitudinal tilting movements, which are imparted to the jack as the point of operation of the tool is transferred around the shoe, are caused to take place about a center substantially coincident with the point of operation of the tool whether or not automatic means are provided for imparting these movements to the jack.

The machine in which I have embodied the various features of my invention is also the first machine, so far as I am aware, in which the jack is automatically actuated to maintain the portion of the sole in proximity to the tool in substantially the same plane as the point of operation of the tool is transferred around the shoe, and I accordingly consider a feature of my invention to consist in providing automatic mechanism for so actuating a jack whether or not the movements which are imparted to the jack to maintain the portion of the sole in proximity to the tool in the same plane take place about a center substantially coincident with the point of operation of the tool.

My invention also consists in the devices, combinations and arrangements of parts hereinafter described and claimed, the advantages of which will be obvious to those skilled in the art.

A preferred form of my invention is illustrated in the accompanying drawings in which,—

Figure 10:
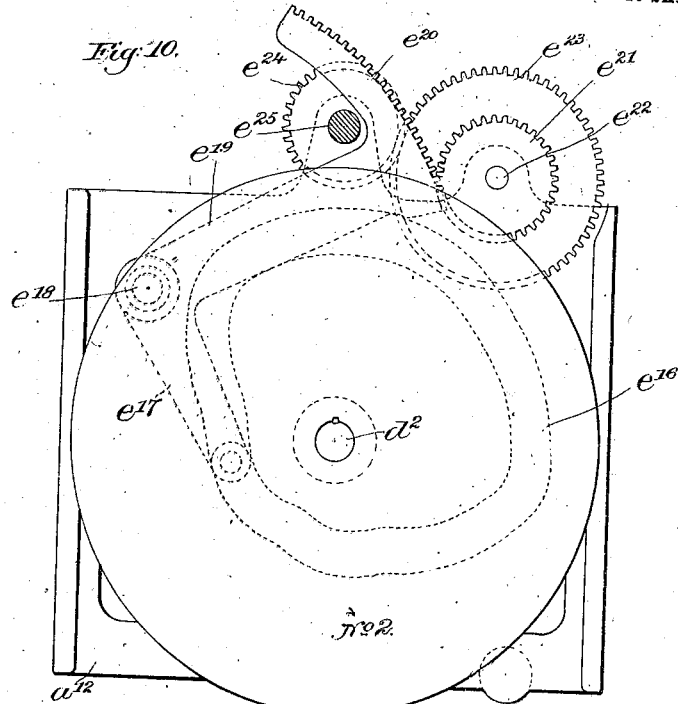
Figure 11:
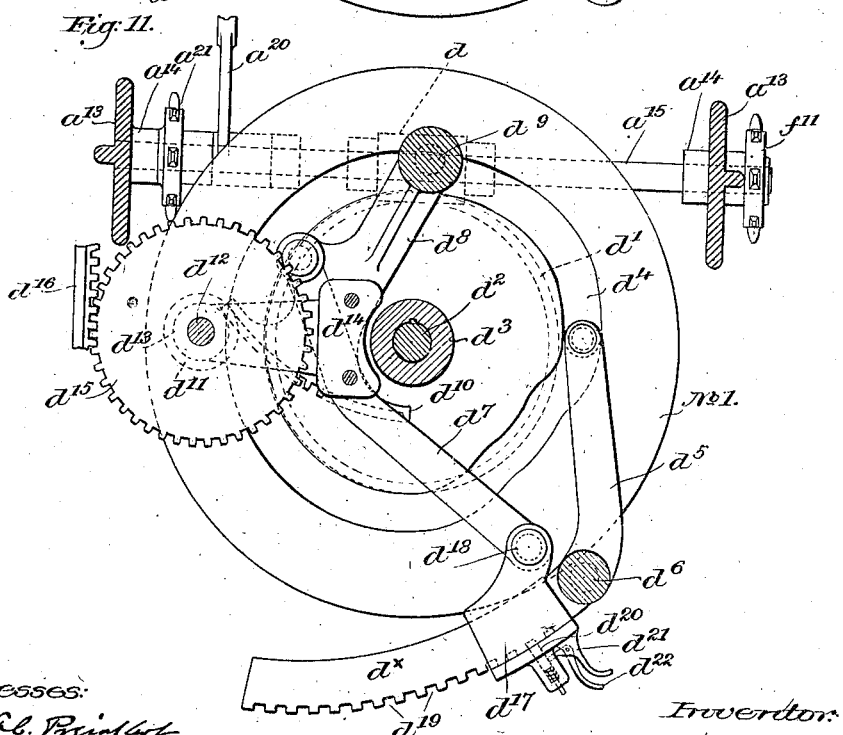
Figure 12:
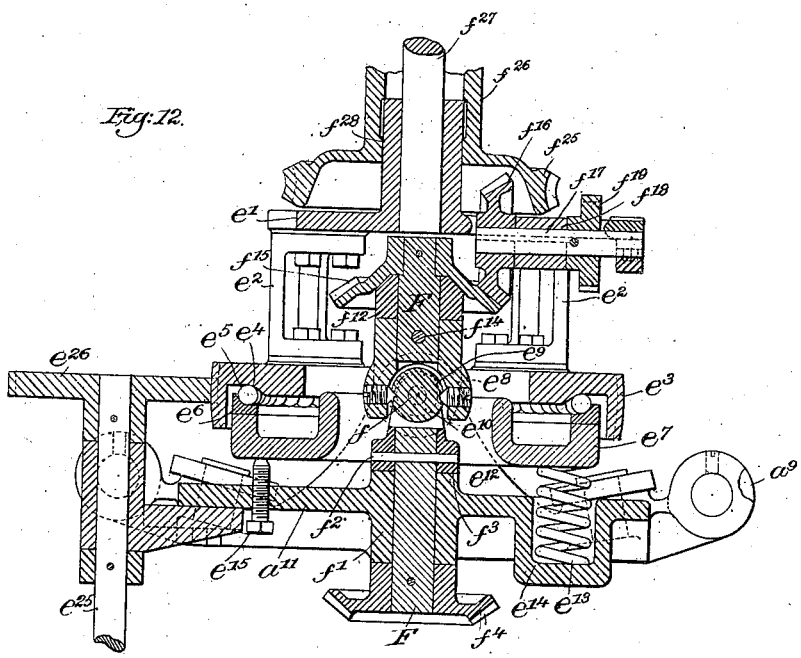
Figure 13:
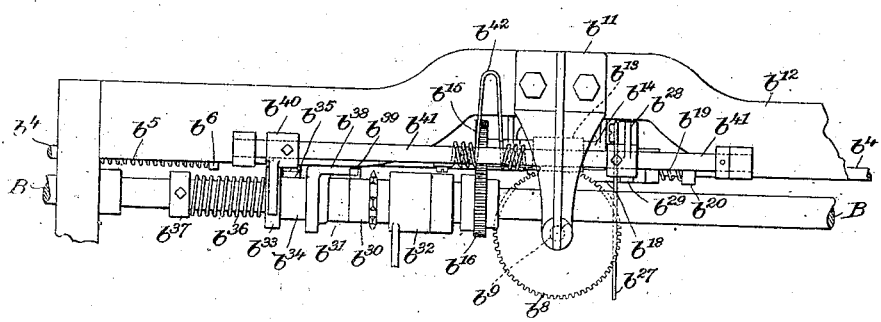

Figure 1 is a front elevation of the machine showing the entire supporting frame, but with one of the last operating instrumentalities removed; Fig. 1ᵃ shows an enlarged view of the right-hand portion of Fig. 1; Fig. 2 shows the machine in end elevation looking toward the right of Fig. 1; Fig. 2ᵃ shows an enlarged view of the right-hand portion of Fig. 2; Fig. 3 shows in plan, and a partial horizontal section, the last supporting jack and portions of the mechanism which imparts thereto its longitudinal feeding movement and its longitudinal tilting movement; Fig. 4 is a section of the mechanism represented in Fig. 3 taken on the line $x$—$x$; Figs. 5, 6, 7 and 8 represent details of the driving mechanism which will be hereinafter referred to, Fig. 7 being of a somewhat larger scale than the remaining figures; Fig. 9 is a horizontal sectional view taken on line $y$—$y$ Fig. 1; Fig. 10 a section taken on the line $z$—$z$ Fig. 1; Fig. 11 is a section on the line $z'$—$z'$ Fig. 1; Fig. 12 is a vertical section of a portion of the mechanism taken on the line $y'$—$y'$ of Fig. 1; Fig. 13 is a rear view of the mechanism shown in Fig. 5; Fig. 14 is a view showing details of the mechanism which moves the jack supporting carriage along its guideways; Fig. 15 is a view showing details of the mechanism which turns the revolving head which carries the jack, and Fig. 16 is a view showing details of the mechanism which imparts the longitudinal feeding movement to the jack and also the longitudinal tilting movement.

In general the mode of operation of the machine shown in the drawings is as follows: Assuming that in the machine of the drawing there is mounted on the frame a rough rounding and channeling machine arranged to trim off the edge of the shoe sole and cut a channel in the surface thereof, the action of the machine is such as to accurately position the last with a shoe thereon with relation to the rough rounding and channeling knives (shown in dotted lines Fig. 2) and to feed the shoe along to be acted on by said knives. Assuming that the machine of the drawing has a work gage which fits into the crease between the upper and welt and that operation is taking place on a left shoe, the shoe will be moved along following the curved portion of the shank to a point at the beginning of the ball portion, during which movement the forward part or toe portion of the last will be tipped downwardly in order that the shank portion shall be properly positioned with relation to the tool or as nearly as possible in a horizontal plane. When the feeding movement of the last has brought the gage at the beginning of the ball portion, the heel of the last will begin to descend and the toe to rise, in order that the ball portion of the last shall be placed in a substantially horizontal plane, and as the work progresses and extends from the ball toward the toe, the heel of the last will be still further depressed, bringing the toe up, with the forward portion of the bottom of the shoe sole in substantially a horizontal plane, and as the work progresses along the shoe and reaches the inner shank portion the toe will be again depressed and the shoe assume the position which it had at the beginning of the operation. This feeding and tilting movement of the last which has just been described, positions the bottom of the shoe sole with relation to the tools, and therefore accommodates the irregular contour of the bottom of the shoe sole to the tools. While the motions of the last just described are taking place the last will be moved in and out toward and from the gage, and will also be tipped or rocked sidewise and swung laterally on a vertical axis, in order to properly position the irregular outline of the edge of the last or shoe sole to the tool. It will thus be seen that all parts of the surface and edge of the shoe sole will be properly positioned with relation to the operative instrumentalities of the machine.

The longitudinal tilting movements of the last and the lateral rocking movements take place about axes which always pass through the point of operation of the tool or substantially through this point regardless of the point on the shoe at which the tool may be operating, that is, the center about which the last is tilted and rocked does not change as the jack is moved to transfer the point of operation of the tool around the shoe but remains at the point of operation of the tool during the entire operation of transferring such point around the shoe. The longitudinal tilting and lateral rocking movements of the last do not therefore act to shift the point on the shoe which is in position to be acted on by the tool and accurate and satisfactory work is produced, the longitudinal tilting and lateral rocking movements of the last being similar to the movements imparted to a shoe when held in the hand of an operator.

In the machine shown in the drawings the vertical axis about which the last is swung laterally in order to bring the outline of the edge of the last or the shoe sole into proper position with relation to the tool does not pass through the point of operation of the tool, but passes through the central longitudinal axis of the last or shoe sole. The position of this axis, however, remains fixed as the point of operation of the tool is transferred around the shoe, except as the last is moved in and out toward and from the gage. This axis is thus sufficiently close to the point of operation of the tool at all times to enable the last to be swung laterally at the proper times to bring the outline of the edge of the last or shoe sole in proper position with relation to the tool without interfering with the proper operation of the tool, and this arrangement of the vertical axis has proved highly satisfactory in actual practice.

Referring now to the drawings in which like characters of reference indicate like parts, A represents a frame which as shown in Fig. 1, is of such a size as to receive two jacks and their actuating mechanism, one jack being designed to support and feed a left last, and the other a right last. Only one jack is shown in the drawing however, which is arranged at the right hand end of the machine and which will in practice support and actuate a right last. The mechanism of each jack is identical so that the description of one will be sufficient to impart a clear idea of the construction and mode of operation of the machine. The supporting frame A comprises vertical standards or side frames $a$ (see Figs. 1 and 2) which are arranged to support at their upper ends a cross girt or table $a'$ which may be of any suitable shape and configuration designed to support, in proper relation to the last carried by the jack, any machine or other instrumentalities used in the manufacture of boots and shoes.

In Fig. 2 of the drawing has been illustrated in dotted lines diagrammatically the knives of a rough rounding and channeling machine, which will in practice be supported on the table $a'$. Each jack is supported upon a swinging jack frame A' which is fulcrumed at its lower end upon a shaft $a^2$ and about which the jack frame A' has a limited swinging movement for the purpose of placing the last and jack in operative relation to the instrumentalities of the machine which operate on the boot or shoe, and for removing the shoe and last away from the said instrumentalities after they have completed their work on the shoe then on the jack. A suitable stop is provided for the purpose of limiting the outward movement of the jack frame A' and the jack supported thereby, and as will be hereinafter described the said frame is retained in its inward position by a suitable automatic latch mechanism, which is released just prior to the completion of one cycle of movement of the jack operative mechanism. In suitable bearings $a^3$ at the rear of the frame A is mounted the main shaft B which extends across the back of the machine from one side frame $a$, to the other side frame $a$, and which communicates motion to both jacks. Shaft B carries at one end the pulley $b$ which is normally loose on said shaft and upon which it is arranged to have a limited sliding movement, whereby it will be connected to and disconnected from said shaft by means of a suitable clutch mechanism to be described. Any suitable form of clutch device may be employed to connect and disconnect the pulley $b$ with and from the shaft B, that shown in the drawings consisting of a collar $b'$ which is fixedly secured to the shaft B and which carries a pin upon its face next the face of the hub of the pulley $b$, which is arranged to engage with a complementary pin or other suitable device in the hub of the pulley $b$.

Any suitable means may be provided for moving the pulley $b$ along the shaft B to connect and disconnect the complementary faces of the hub of the pulley $b$ and the collar $b'$, but in the machine of the drawings I have arranged the mechanism so that said pulley will be moved in one direction by the operator to engage the clutch members and will be automatically moved in the opposite direction. As shown in the drawing the hub of the pulley $b$ is grooved as shown at $b^2$ (see Fig. 8) and said groove is engaged by a forked arm $b^3$ fixedly secured to a rod $b^4$ which rod is arranged to have a sliding movement in suitable bearings in the frame A. The rod $b^4$ is moved in one direction to move the pulley $b$ toward the clutch collar $b'$ by means of a coiled spring $b^5$ which surrounds the rod $b^4$ and which bears at one end against one of the side frames $a$, and at its opposite end against a collar $b^6$ fixedly secured to the rod $b^4$. The rod $b^4$ is moved in the opposite direction to move the pulley $b$ away from the clutch collar $b'$ to stop the rotation of the shaft B by means of a dog $b^7$ carried by a worm gear $b^8$ arranged to revolve on a suitable stud $b^9$ fixed in a bearing $b^{10}$ at the lower end of a bracket $b^{11}$ which is fixedly secured to a cross piece $b^{12}$ connecting the side frames $a$. The worm gear $b^8$ is driven by a worm $b^{13}$ which is carried by a shaft arranged to rotate in suitable bearings $b^{14}$ projecting downward from the under face of the cross piece $b^{12}$, and the worm $b^{13}$ is driven by a pinion $b^{15}$ fixed to the end of the worm shaft which meshes with a pinion $b^{16}$ on the main shaft B. The dog $b^7$ on the worm gear $b^8$ is arranged to engage an arm $b^{17}$ carried by a sleeve $b^{18}$ mounted on the rod $b^4$ and arranged to turn on said rod. The sleeve $b^{18}$ is normally held with the arm $b^{17}$ in the path of travel of the dog $b^7$, by means of a spring $b^{19}$, one end of which engages the sleeve $b^{18}$ and the other end a fixed collar $b^{20}$ on the rod $b^4$.

By the above described mechanism, as the main shaft B revolves, it will, by means of the pinions $b^{16}$ and $b^{15}$ rotate the worm $b^{13}$ and revolve the worm gear $b^8$ and as the dog $b^7$ comes in contact with the arm $b^{17}$, it will move the sleeve $b^{18}$ to the right, as shown in Fig. 5 of the drawings, and cause it, through the fixed collar $b^{21}$, to move the rod $b^4$ to the right, disengaging the complementary clutch faces of the hub of the pulley $b$ and the fixed collar $b'$, bringing the machine to rest. In order to again start the shaft B rotating, the arm $b^{17}$ must be removed from engagement with the beveled dog $b^7$, to secure which result the sleeve $b^{18}$ is rotated against the tension of the spring $b^{19}$, by means of a treadle $b^{22}$ which is fulcrumed at $b^{23}$, and which is pivotally connected at $b^{24}$ to a lever $b^{25}$, which is fulcrumed at $b^{26}$ and which at its rear end is connected by means of a rod $b^{27}$ to a lever $b^{28}$ which, as its forward end is depressed by the treadle mechanism which has been described, will engage an arm $b^{29}$ carried by the sleeve $b^{18}$ and cause said sleeve to be revolved on the rod $b^4$, thus removing the arm $b^{17}$ from engagement with the dog $b^7$, and permitting the spring $b^5$ to move the rod $b^4$ to the left to again connect the complementary clutch faces of the pulley $b$ and the clutch $b'$.

As before stated the last supporting jack and its operating mechanism are duplicated, that is, there will be one for a right last and one for a left last, and it is designed that one shall be operating while the other remains at rest, whereby the operator will be enabled to remove a shoe from one jack and replace it with another shoe during the time that the shoe on the other jack is undergoing the operation of the instrumentalities of the machine carried on the cross head as before described. Both of these jacks are driven from the same shaft B and each of them is connected by an independent clutch mechanism with said shaft, one of which is shown in the drawing and will now be described.

In Figs. 5 and 13 of the drawings is clearly shown one of the driving connections between the shaft B and the jack operating mechanism, and also the devices whereby the driving connections are connected and disconnected from the shaft B. These driving connections comprise a sprocket wheel $b^{30}$ which is normally loose on the shaft B and is retained in position between a fixed collar $b^{31}$ and the hub of a hanger $b^{32}$. Splined to the shaft B and arranged to slide thereon is a sleeve $b^{33}$ which is provided with a groove $b^{34}$ engaged by a forked arm $b^{35}$ fixedly secured to the rod $b^4$. A coiled spring $b^{36}$ surrounding the shaft B presses at one end against a fixed collar $b^{37}$ and at its opposite end against the sleeve $b^{33}$, said spring normally holding the sleeve $b^{33}$ against the fixed collar $b^{31}$. The sleeve $b^{33}$ is provided with a horizontal projecting arm $b^{38}$ which engages a lug $b^{39}$ on the sleeve of the sprocket wheel $b^{30}$ whereby when the parts are in the position shown in Figs. 5 and 13, as the shaft B rotates, a rotary motion will be imparted to the sprocket wheel $b^{30}$ and by means of the instrumentalities which will be hereinafter described impart motion to the jack operating mechanism.

By the above described mechanism it will be noted that not only does the lug $b^7$ when it engages the arm $b^{17}$ and moves the sleeve $b^{18}$ to the right, throw out the complementary clutch faces of the pulley $b$ and the collar $b'$, but it also, through the arm $b^{35}$, carried by the rod $b^4$, moves the sleeve $b^{33}$ to the right, thus removing the arm $b^{38}$ from engagement with the lug $b^{39}$, and permitting the sprocket $b^{30}$ to remain at rest, thus stopping the operation of the jack.

In order to maintain the sleeve $b^{33}$ in the position to which it is moved by the movement of the rod $b^4$ to the right, I have provided an arm $b^{40}$ fixedly secured to a rock shaft $b^{41}$ to which the lever $b^{28}$ is connected, which rock shaft is normally held in such a position that the lever $b^{28}$ will be raised and the arm $b^{40}$ lowered and thrown in engagement with the sleeve $b^{33}$ by torsional spring $b^{42}$ which at one end is fixed to the shaft $b^{41}$ and at its opposite end engages a fixed part of the cross piece $b^{12}$, the arm $b^{40}$ enters the groove $b^{34}$ of the sleeve $b^{33}$ when the sprocket $b^{30}$ is disconnected from the shaft B and by engaging the right-hand flange (Fig. 5) of the sleeve holds the parts $b^{38}$ and $b^{39}$ separated. It will thus be seen that as the lug $b^7$ moves the sleeve $b^{18}$ to the right it will disconnect the pulley $b$ from the shaft B and at the same time, by the movement of the sleeve $b^{33}$ disconnect the sprocket wheel $b^{30}$ from the shaft B, and that the parts will be held in this position until the operator, by means of the treadle mechanism which has been described, depresses the lever $b^{28}$ and rotates the rock shaft $b^{4}$ and simultaneously therewith the sleeve $b^{18}$, thus removing the arm $b^{17}$ from contact with the lug $b^{7}$, and the arm $b^{40}$ from engagement with the collar $b^{33}$, thus permitting the spring $b^5$ to move the rod $b^4$ to the left to again connect the pulley $b$ and the shaft B, and simultaneously therewith the spring $b^{36}$ to move the sleeve $b^{33}$ to the left throwing the arm $b^{38}$ in engagement with the lug $b^{39}$ of the sprocket wheel $b^{30}$ whereby rotary motion will be imparted to the shaft B and to said sprocket. It may be well to state in this connection that while the driving mechanism of the companion pack is substantially the same as the mechanism just described, it is controlled by an independent treadle mechanism, and furthermore that the lever and arm which rotates the sleeve $b^{18}$, and which controls the clutch mechanism of the sprocket wheel of the corresponding jack, and which corresponds to the lever $b^{28}$ and the arm $b^{40}$ shown in the drawings, will be formed integrally, and instead of being fixed to the rock shaft $b^{41}$ will be loose thereon so that each jack may be thrown into connection with the shaft B independently. In other respects the mechanism of the corresponding jack is exactly the same as the one illustrated in the drawing, the sprocket wheel $b^{30}$, the sleeve $b^{33}$, the arm $b^{38}$, the lug $b^{39}$ and the arm $b^{35}$ being duplicated for the other jack and being located at the left of the mechanism illustrated in Fig. 1. It will thus be seen that in the complete machine there will be two treadles and their connections, between independent levers $b^{28}$, each lever controlling its own clutch arm, and each lever arranged to engage a lug $b^{29}$ to turn the sleeve $b^{18}$; it of course being understood that the sleeve $b^{18}$ has two lugs $b^{29}$.

As has been stated the sleeve $b^{33}$ illustrated in the drawing is held in a position to which it is moved by the shipper rod $b^4$ by an arm $b^{40}$ secured to a rock shaft $b^{41}$ and the sleeve $b^{33}$ which is not illustrated in the drawing is held in the position to which it is moved by the shipper rod $b^4$ by means of an arm similar to the arm $b^{40}$ but mounted to turn loosely upon the rod $b^{41}$. The arms which lock the sleeves $b^{33}$ in a position in which the sprocket wheels $b^{30}$ are unclutched from the driving shaft B can thus be operated independently of each other to release the sleeves $b^{33}$. When one of the sleeves is released by the actuation of its locking arm the sleeve is moved into a position in which the sprocket wheel $b^{30}$ is clutched to the driving shaft B by means of a spring $b^{36}$. The arm $b^{40}$ illustrated in the drawing is actuated by a treadle connected by a rod to an arm $b^{28}$ secured to the rock shaft $b^{41}$ and this arm is arranged when depressed to rock the sleeve $b^{18}$ to remove the arm $b^{17}$ from the projection $b^7$ and allow the shipper rod to be moved to clutch the driving shaft to its driving pulley. The other locking arm is actuated by an arm similar to the arm $b^{28}$ but rigidly secured to the locking arm and also arranged when depressed to rock the sleeve $b^{18}$ to remove the arm $b^{17}$ from the projection $b^7$. When the shipper rod $b^4$ is released and allowed to move to clutch the driving shaft to its driving pulley one of the sprocket wheels $b^{30}$ is clutched to the driving shaft, the other sprocket wheel $b^{30}$, however, remaining unclutched on account of the engagement of the locking lever which has not been actuated with a sleeve $b^{33}$.

As hereinbefore explained the swinging frame A' of each jack has a swinging movement about its fulcrum $a^2$ in order to place the last and the shoe thereon in operative position with relation to the tools of the shoe working machine supported on the table $a'$, and I have provided a locking or latching device arranged to maintain the frame A' in its inward position or in the position shown in Fig. 2 of the drawing. I have also so constructed the latching device that as the tools finish their operation upon the shoe, the latching or locking device will be automatically released and the frame A' moved outward in order to remove the shoe from operative position with relation to the tools of the shoe working machine, and while thus thrown outward, the jack with the last thereon turns backward to its original position before the operation of the machine is stopped by the contact of the beveled dog $b^7$ with the arm $b^{17}$ to ship the clutch mechanism and stop the machine.

The latching device of the machine of the drawing is shown in Figs. 5 and 7 and consists of a pivoted latch C which is fulcrumed at $c$ to a bracket $c'$ fixed to the cross piece $b^{12}$ of the frame A. The latch C is arranged to engage a lug $c^2$ projecting rearwardly from the upper end of the frame A'. The latch C is normally held in position to engage the lug $c^2$ by a coiled spring $c^3$ which at one end is connected to a fixed portion of the cross piece $b^{12}$ and at its other end is connected to a lever $c^4$ which is fulcrumed at $c^5$, the upper end of said lever $c^4$ being connected by means of a link $c^6$ to the latch C. It will thus be seen that as the frame A' is moved inward or backward to place the shoe in position to be acted upon by tools of the shoe working machine, the latch C will be forced forward in the position shown in Fig. 5 by the spring $c^3$ to engage the lug $c^2$, and thus maintain the frame A' in its inward position.

I have arranged means for withdrawing the latch C and releasing the lug $c^2$ a short time prior to the completion of a cycle of operation of the jack mechanism, and such means consists of a stud $c^7$ carried by the worm gear $b^8$, which is arranged to come in contact with the lower end of the lever $c^4$ as shown in Fig. 5 of the drawings, and through said lever and the link $c^6$ withdraw the latch C, whereby the frame A' may be thrown forward about its fulcrum $a^2$ to remove the last and shoe away from the shoe working tools. In order to insure that the frame A' will be thus thrown outward I have provided a suitable shifting device consisting of a link $c^8$ Fig. 2 which at one end engages an eye $c^9$ at the upper rear end of the frame A', and which link is connected by means of a spring $c^{10}$ with a rod $c^{11}$ connected to the cross head $a'$ or some other fixed part of the frame A, the construction being such that as the latch C is withdrawn from engagement with the lug $c^2$ the springs and rods $c^8$, $c^{10}$ and $c^{11}$ will rock the frame A' about its fulcrum and move it to its outward position.

In order to positively insure that the latch C will be in position to engage the lug $c^2$ as the frame A' is moved inward, I provide a suitable pawl or detent arranged to maintain the latch C in its retracted position against the tension of the spring $c^3$, such pawl or detent being so arranged as to be tripped by the engagement of the lug $c^2$ therewith to release and permit the advance of the latch C to engage the lug $c^2$. This pawl or detent is shown in Fig. 5 and consists of a thin plate or lever $c^{12}$, which at one end is fulcrumed to the latch C and at its other end is provided with an angular slot $c^{13}$ engaging a pin $c^{14}$ on the bracket $c'$.

A suitable coiled spring $c^{15}$ is connected at one end to the pawl or detent $c^{12}$ and at its other end to the latch C, and acts to raise the pawl or detent $c^{12}$ when the latch C is drawn back, the result being that as the latch C is drawn back the pawl or detent $c^{12}$ will be raised throwing the pin $c^{14}$ in the lower end of the angular slot $c^{13}$, in which position the pawl or detent will be maintained by the spring $c^{15}$, thus holding the latch C back against the tension of the spring $c^3$, in which position the latch remains until by the backward movement of the frame A', to place the jack and the shoe thereon, in operative position, the lug $c^2$ comes in contact with the pawl or detent $c^{12}$, depressing said pawl or detent and bringing the upper part of the slot $c^{13}$ in line with the pin $c^{14}$, thus permitting the spring $c^3$ to throw the latch C forward in position to engage the lug $c^2$. It is of course to be understood that the latching and locking mechanism just described is duplicated, and that each latch will be released at the proper time by the stud $c^7$ and the lever $c^4$ it of course being further understood that the connection of the other latch with the said lever $c^4$ is of such a character that when one latch is in engagement with its corresponding lug $c^2$, the other latch will be opened and set to engage the lug on the other frame A'. Each jack frame A' comprises two side frame sections $a^4$ which are connected together at the bottom by a yoke $a^5$ in which is formed a tubular sleeve which surrounds the fulcrum $a^2$. At their rear ends each side frame $a^4$ is connected by a cross piece $a^6$.

As shown in Fig. 2 of the drawings the upper edges of the side frames $a^4$ are curved and upon their inner faces are formed curved guide ways or tracks $a^7$, the said guide ways or tracks being preferably formed on the arc of a circle, the center of which will be substantially at a point occupied by the tool or tools of the shoe working machine, or approximating the working ends of the tools of said machine. Supported by the swinging jack frame A' is a jack supporting carriage $a^8$, the said carriage $a^8$ being provided with rolls $a^9$ at its upper end which are received within the guides or tracks $a^7$ and by means of which the jack supporting carriage $a^8$ is supported in the swinging jack frame A'. Each jack supporting carriage $a^8$ is formed of two side plates $a^{10}$ which at their upper ends are connected to a plate $a^{11}$ and which at their lower ends support a plate $a^{12}$, and each jack supporting carriage $a^8$ supports and carries the jack and its operating mechanism. Projecting downwardly from the plate $a^{12}$ are arms $a^{13}$ which at their lower ends are provided with suitable bearings $a^{14}$ which support a shaft $a^{15}$ through which power is communicated by mechanism which will be hereinafter described, to all the operative instrumentalities of the jack. The shaft $a^{15}$ is driven from the shaft B by means of sprocket chains $a^{16}$ and $a^{17}$, the sprocket chain $a^{16}$ being driven by the sprocket wheel $b^{30}$ on the shaft B, and communicating motion to a sprocket wheel upon one end of a short shaft $a^{18}$ supported at the junction of a suitable hanger, consisting of adjustable bars $a^{19}$ and $a^{20}$, the bar $a^{19}$ at its upper end carrying a sleeve $b^{32}$ which surrounds the shaft B. Upon another sprocket wheel on the opposite end of the shaft $a^{18}$, the chain $a^{17}$ runs, and by which it is driven, and the said chain $a^{17}$ engages a sprocket wheel $a^{21}$ upon the shaft $a^{15}$. The shaft $a^{15}$, as before stated, communicates motion to all the working parts of the jack by means of intermediate connecting mechanisms which will now be described.

As hereinbefore stated the jack is moved so as to rock the last laterally from side to side in order to bring the bottom portion of the shoe sole along the shank and ball portion to a proper position for the action of the shoe working tools thereon, and approximately places that portion of the bottom of the shoe sole at which work is going on, in a horizontal plane, to secure which results the sliding jack supporting carriage $a^8$ is moved along in a curved path controlled by the guide ways $a^7$, which results in the rocking of the last supported by the jack laterally about a center substantially coincident with the point of operation of the tools of the shoe working machine.

The jack supporting carriage $a^8$ is caused to travel along the guide ways $a^7$ by the following mechanism:—Upon the shaft $a^{15}$ is a worm $d$ which meshes with a worm gear $d'$ supported by the end of a shaft $d^2$ which shaft is fitted to revolve in suitable bearings $d^3$ formed integrally with the plate $a^{12}$ and which is held suspended in said carriage by being secured in the hub of the cam No. 2, which cam rests on the upper surface of the portion of the bearing $d^3$ above the plate $a^{12}$. The rotation of the worm gear $d'$ will therefore, it will be seen, impart a rotary motion to the cam No. 2 and also to the cam No. 1 which is fixedly secured to the shaft $d^2$ above the worm gear $d'$. Cam No. 1, see Figs. 11 and 14, is provided with a cam groove $d^4$ which receives a cam roll on one end of a lever $d^5$ which is fulcrumed at $d^6$ to a post projecting downward from beneath the plate $a^{12}$. The opposite end of the lever $d^5$ is connected by means of a link $d^7$ to a lever $d^8$ which is fulcrumed at $d^9$ to the under side of the plate $a^{12}$ and which at its forward end carries a segment gear $d^{10}$ which engages a pinion $d^{11}$ carried by the lower end of a shaft $d^{12}$ supported in a bearing $d^{13}$ carried by an arm $d^{14}$ fixedly secured to the under side of the plate $a^{12}$. To the upper end of the shaft $d^{12}$ below the plate $a^{12}$ is fixed a beveled gear $d^{15}$ which meshes with a curved beveled rack $d^{16}$ secured to the inner surface of one of the side frames $a^4$.

The above arrangement is such that as the shaft $a^{15}$ rotates it will by means of the worm $d$ and the worm gear $d'$, impart rotary motion to the shaft $d^2$, thus rotating cam No. 1, and by means of the lever $d^5$, link $d^7$, lever $d^8$, segment $d^{10}$, pinion $d^{11}$, beveled gear $d^{15}$ and the curved beveled rack $d^{16}$ cause the jack supporting carriage $a^8$ to move back and forth along the curved guide or track $a^7$.

In order to adjust the range of movement of the jack supporting carriage $a^8$ I provide an adjustable connection between the lever $d^5$ and the segment lever $d^8$, such adjustment in the machine of the drawing comprising a sliding box $d^{17}$ which is preferably provided with a curved bearing to receive the end $d^x$ of the lever $d^5$, and the link $d^7$ is pivotally connected at $d^{18}$ to said sliding box $d^{17}$.

As clearly shown in Fig. 11 of the drawings the end $d^x$ of the lever $d^5$ is notched or serrated as shown at $d^{19}$, and the sliding box $d^{17}$ is provided with a spring pressed bolt $d^{20}$ which is arranged to engage one of the notches or serrations $d^{19}$, and hold the box $d^{17}$ to the position to which it may be moved along the arm $d^x$ of the lever $d^5$.

As shown in Fig. 1 of the drawing the sliding box $d^{17}$ is placed at the front of the machine within easy reach of the operator, and I have provided a suitable hand lever $d^{21}$ and a lever $d^{22}$ controlling the bolt $d^{20}$ whereby the bolt $d^{20}$ may be withdrawn and the sliding box $d^{17}$ adjusted along the arm $d^x$ by the operator in order to adjust the in and out sliding movement of the jack supporting carriage $a^8$ for any given size or style of last.

Mounted upon the jack supporting carriage $a^8$ is a revolving head E which comprises two side frames $e$ which at their lower end rise from a skeleton base plate $e'$ which base plate $e'$ is supported upon blocks $e^2$ which project vertically from and which are secured to a gear $e^3$, the gear $e^3$ (see Fig. 12) being provided upon its under face with a race $e^4$ which rests upon hardened steel balls $e^5$ which are supported in a race $e^6$ of a tilting supporting plate $e^7$, the plate $e^7$ being substantially circular at its central portion and provided at diametrically opposite ends with upturned ears $e^8$ (see Fig. 1) provided with bearings $e^9$ in which are fixedly secured suitable trunnions $e^{10}$ which are received in bearings $e^{11}$ carried by upwardly projecting arms $e^{12}$ of the top plate $a^{11}$ of the jack supporting carriage $a^8$.

By pivoting the tilting supporting plate $e^7$ at diametrically opposite points as shown, the revolving head and the last supporting jack are arranged to have a slight swinging motion with the trunnions $e^{10}$ as the axis, whereby the last may move back and forth toward and away from the gage or the operating tools of the machine to accommodate for the conformation of the sides of the last, and in order to yieldingly hold the last or the shoe thereon against the gage or tool of the shoe working machine I have provided a suitable spring $e^{13}$ which is received within a recess or seat $e^{14}$ formed in the plate $a^{11}$, and which at its upper end bears against the under side of the front of the tilting plate $e^7$ and acts to normally swing the plate $e^7$ upward and thus yieldingly hold the shoe or last in contact with the gage of the machine. At a diametrically opposite point on the plate $a^{11}$ I have provided an adjustable stop $e^{15}$ consisting of a screw which is tapped in a bearing in said plate, the upper end of which is arranged to act as a seat or stop for the tilting plate $e^7$, whereby to limit the tilting of the plate by the spring $e^{13}$.

The revolving head E is cause to revolve by the cam No. 2 (see Figs. 1, 10 and 15) which is secured to the upper end of the shaft $d^2$ and which on its under face has a cam path $e^{16}$ which engages a cam roll carried by one arm $e^{17}$ of a bell crank lever which is fulcrumed at $e^{18}$ to the upper side of the plate $a^{12}$, the other arm $e^{19}$ of the bell crank lever carrying a segment gear $e^{20}$ which meshes with and drives a pinion $e^{21}$ mounted to revolve about a stud $e^{22}$ fixed in the upper surface of the plate $a^{12}$. Beneath the pinion $e^{21}$ and secured thereto or formed integrally therewith is a gear $e^{23}$ which meshes with a gear $e^{24}$ on the lower end of a shaft $e^{25}$ mounted to revolve in suitable bearings projected from the rear side of the plates $a^{12}$ and $a^{11}$ and said shaft $e^{25}$ carries at its upper end a gear $e^{26}$ which meshes with the gear $e^3$.

The above arrangement is such that a rotation of the shaft $d^2$ will impart a rotation to the cam No. 2 and by means of the bell crank lever $e^{17}$ and $e^{19}$ and the segment gear $e^{20}$, gears $e^{21}$, $e^{23}$ and $e^{24}$ revolve the shaft $e^{25}$ and through the gear $e^{26}$ and large gear $e^3$ turn the revolving head E. It is perhaps well to remark at this point that the revolution of the head E is not a continuous steady turning of the head and jack in one direction, but the shape of the cam path $e^{16}$ is such, that it will impart to the head and last a turning or swinging movement about a vertical axis backward and forward in opposite directions as the feeding movement of the jack progresses, to bring various parts of the sides of the last or the shoe under the action of the tools of the shoe working machine in proper relation to such tools, whereby the last will be swung in first one direction, then the other, according as the curved portion of the last along which work is progressing is concave or convex, in order that the tools of the shoe working machine may act on all parts of the irregular edge of the sides of the sole, and that the portion of the edge of the last or shoe sole in proximity to the tool may be maintained substantially parallel with the line of feed.

The mechanism for imparting the longitudinal feeding movement to the jack consists of the shaft F which as shown in Figs. 12 and 16 of the drawing is formed in two sections and united by a gimbal joint $f$ whereby the tilting motion of the plate $e^7$ and the head supported thereon is not interfered with. The lower section of the shaft F is supported to revolve in a bearing $f'$ formed in the plate $a^{11}$ and at its upper end is connected by means of a pin $f^2$ to one member of the gimbal joint $f$ which rests upon a boss $f^3$ surrounding the bearing $f'$. Secured to the lower end of the lower section of the shaft F is a bevel gear $f^4$ which meshes with and is driven by a bevel gear $f^5$, secured to one end of a short shaft $f^6$ mounted in the bearing $f^7$, carried by the lower end of a bracket $f^8$ secured to the under face of the plate $a^{11}$.

Shaft $f^6$ at its outer end carries a sprocket wheel $f^9$ from which runs a chain $f^{10}$ which is driven from the sprocket wheel $f^{11}$ on the shaft $a^{15}$ whereby as the shaft $a^{15}$ rotates, a rotary motion will be imparted to the shaft F. The upper section of the shaft F is supported by a bearing $f^{12}$ carried by upwardly projecting arms $f^{13}$ secured to the tilting plate $e^7$, and at its lower end the upper section of the shaft F is secured by a pin $f^{14}$ to the upper member of the gimbal joint $f$, and to the upper end of the upper section of the shaft F is secured a bevel gear $f^{15}$ which meshes with a bevel gear $f^{16}$ secured to a shaft $f^{17}$ arranged to rotate in a bearing $f^{18}$ supported by the revolving head E. The shaft $f^{17}$ upon its opposite end outside of the bearing $f^{18}$ carries a gear $f^{19}$ which meshes with an intermediate gear $f^{20}$ which in turn meshes with a gear $f^{21}$ carried by a shaft $f^{22}$ mounted in a bearing $f^{23}$ projecting upwardly from the plate $e^1$.

On the shaft $f^{22}$ is a worm $f^{24}$ which meshes with a worm gear $f^{25}$ which is provided with a tubular sleeve $f^{26}$ to the upper end of which are secured the double cams Nos. 3 and 4, cams Nos. 3 and 4 and the worm gear $f^{25}$ being arranged to revolve about a stud $f^{27}$ secured in a tubular bearing $f^{28}$ which is supported by the plate $e'$. The cam No. 3 is provided with a cam path $f^{29}$ which receives a cam roll on an arm $f^{30}$ of a lever fulcrumed at $f^{31}$ in a bearing carried by one of the uprights $e$, the opposite arm $f^{32}$ of the lever being connected by means of a link $f^{33}$ to a lever $f^{34}$ fulcrumed at $f^{35}$ to a bearing projected upwardly from the plate $e'$. Lever $f^{34}$ carries at its outer end a segment gear $f^{36}$ which meshes with a pinion $f^{37}$ carried by the upper end of a short shaft $f^{38}$ arranged to revolve in a bearing formed in the plate $e'$, and which at its lower end carries a gear $f^{39}$ which meshes with a round face gear $f^{40}$ carried by the lower end of a suitable extensible shaft $f^{41}$; shaft $f^{41}$ being supported at its lower end in a bearing $f^{42}$, which bearing is carried by a swiveling arm $f^{43}$, arranged to turn about a fulcrum $f^{44}$.

The jack H is shown in Figs. 3 and 4 and consists of a plate $h$ which at its forward end has a suitable toe support $h'$ and at its rear end a suitable heel support or spindle $h^2$. The plate $h$ is supported by slides $h^3$ which are fitted to horizontally disposed guides $h^4$ carried by plates $h^5$, which plates are pivotally supported by pins $o'$ in bearings in the standards $h^6$ projected upwardly from a plate $h^7$. A movement of the slides $h^3$ along the guides $h^4$ imparts the longitudinal feeding movement to the last supported by the jack H, and in order to secure this movement of the slides $h^3$ along the guides $h^4$ one of the said slides is connected at opposite ends to a sprocket chain $h^8$ which at one end runs around an idle sprocket wheel $h^9$ supported by a bearing $h^{10}$ projected from one end of one of the plates $h^5$. At the opposite end of the plate $h^5$ the sprocket chain $h^8$ passes around the sprocket wheel $h^{11}$ secured to a short shaft $h^{12}$ mounted in a bearing $h^{13}$ and the shaft $h^{12}$ is connected by a gimbal joint $h^{14}$ with the extensible shaft $f^{41}$.

The above described arrangement is such that a rotation of the shaft F by means of the shaft $f^6$ and its connections with the shaft $a^{15}$, will through the bevel gears $f^{15}$ and $f^{16}$, shaft $f^{17}$, and gearing $f^{19}$, $f^{20}$ and $f^{21}$, the worm $f^{24}$, worm gear $f^{25}$, lever $f^{30}$, $f^{32}$, link $f^{33}$, segment $f^{36}$, gearing $f^{37}$, $f^{39}$ and $f^{40}$, revolve the shafts $f^{41}$ and $h^{12}$, and by means of the sprocket wheel $h^{11}$ and the sprocket chain $h^8$ move the slides $h^3$ along the guides $h^4$, thus moving the jack and last longitudinally. In this connection it is to be noted that while the cam No. 3 is supported by and partakes of the turning movement of the revolving head E, the said cam in its operation to effect the longitudinal feeding of the jack is entirely independent of the mechanism which revolves the head E, and the movement of the cam with the head will not affect the longitudinal movement of the jack, such movement being effected by the rotation of the cam with relation to the head E.

By the mechanism so far described the jack has imparted to it three movements, first, a lateral or sidewise rocking movement with relation to the tools of a shoe working machine, whereby the shank portions of the last upon opposite sides thereof will be brought into proper horizontal position; a lateral swinging or turning movement about a vertical axis to bring all parts of the curved sides of the last in proper relation to the shoe working tools, and to turn the last as the work progresses around the toe, and also a longitudinal feeding movement.

It is necessary in order to position the last to the tool of the machine with relation to the various curves of the bottom of the last, to impart to the last a tilting movement in a longitudinal direction from toe to heel, which movement is secured as follows:—The plate $h^7$ which supports the standards $h^6$ is curved in the arc of a circle the center of which is substantially coincident with the point of operation of the tools as shown in Figs. 1, 4 and 16 and at its opposite sides is received in curved guides $i$ (see Figs. 1, 2 and 16) which are supported by the standards $e$ of the revolving head E, and the plate $h^7$ is reciprocated along the curved guides $i$ by means of a bevel gear $i^2$ secured to the upper end of a short shaft $i^3$, arranged to revolve in a bearing $i^4$ carried by the bracket $i^5$ projecting inward from one of the cross bars of the frame E.

At its lower end shaft $i^3$ carries a pinion $i^6$ which meshes with segment gear $i^7$ carried by an arm $i^8$ of a lever fulcrumed at $i^9$, the other arm $i^{10}$ of the lever being pivotally connected at $i^{11}$ to a link $i^{12}$, which in turn is pivotally connected to an arm $i^{13}$ of a lever fulcrumed at $f^{31}$, the other arm $i^{14}$ of the lever carrying a cam roll $i^{15}$ which engages the cam path in the cam No. 4. The bevel gear $i^2$ engages a curved rack $i^{16}$ secured to the plate $h^7$, the operation being such that upon a revolution of the cam No. 4 it will through the lever $i^{14}$ and $i^{13}$, link $i^{12}$, lever $i^8$ and $i^{10}$, segment gear $i^7$, pinion $i^6$, bevel gear $i^2$, and curved rack $i^{16}$, impart a reciprocating movement to the plate $h^7$ and the last support H supported thereby. The cam No. 4 is of such shape that during one cycle of movement of the machine, the plate $h^7$ will be moved several times back and forth for varying distances along the curved guide, thus lowering or raising the heel or toe as the case may be, to place the bottom surface of the last at the point where work is being done, in the proper position for the action of the tools thereon. It will be evident that if the guides were rigidly supported in the standards $h^6$ of the plate $h^7$, a movement of the plate $h^7$ along the curved guides $i$ would operate to tilt the jack longitudinally about a center coincident with the point of operation of the tools regardless of the position of the jack on the guides $h^4$. The guides $h^4$ are however maintained in a substantially horizontal position during the movement of plate $h^7$ as will be described, but as the jack is yieldingly supported by the slides $h^3$ which travel in the guides $h^4$ by means of suitable springs as will hereinafter appear the maintaining of the guides in a horizontal position has no material effect on the tilting movement of the jack above described the springs acting to hold the shoe in contact with the tools or the gage at all times. It will be noted that the connection between the link $f^{33}$, and the lever $f^{32}$, and also the connection between the link $i^{12}$ and the lever arm $i^{13}$ is an adjustable connection, substantially the same as that between the link $b^7$ and the arm $d^x$ of its actuating lever, which has been hereinbefore described.

In order to insure, no matter what the angular disposition of the last may be in a longitudinal line from the toe to the heel, the correct feeding of that portion of the shoe sole or the last at which work is being performed in substantially a horizontal plane, I have arranged the plates $h^5$ which support the guides $h^4$ along which the slides $h^3_y$ move, to always maintain their horizontal position, during the movement of the plate $h^7$ along its guide way for the purpose of effecting the tilting of the last. To secure this result each plate $h^5$ is pivotally secured to the upper end of the standards $h^6$, the said standards being provided with suitable bearings $o$ which receive pins or studs $o'$ projected from the outer face of the plates $h^5$, and in order to maintain the plates $h^5$ in alinement with relation to each other in the same horizontal plane, or in parallel horizontal planes, I have secured to the outer ends of the studs $o'$ arms $o^2$ which project downwardly as shown in Figs. 1, 4 and 16 and said arms at their lower ends are provided with rollers $o^3$ which engage segmental guide grooves $o^4$ formed in plates secured to the upper ends of the side plates $e$ of the head E, the said plates carrying the guide grooves $o^4$ being arranged in different arcs and so disposed that during the horizontal reciprocation of the plate $h^7$ when moving in one direction, the arms $o^2$ will maintain the plates $h^5$ in a horizontal position notwithstanding the change in the angular position of the standards $h^6$ with relation to a vertical plane.

It will be noted that as the plate $h^7$ is moved along the guideways $i$, that the roll $o^3$ at the end of one arm $o^2$ will be caused to travel downward along its guide $o^4$, while the roll of the opposite arm will be caused to travel upward along its guide, and inasmuch as the arms $o^2$ are fixedly secured to the studs $o'$ of the guide plates $h^5$, such plates will always maintain a horizontal position notwithstanding that they are supported by the plate $h^7$ which moves in an arc of a circle.

In order to allow the guides $h^4$ to be maintained in a substantially horizontal position without producing any material effect on the tilting movements of the jack and to allow the jack to rise and fall to keep the shoe in contact with the tool or gage at all times I have arranged to support the jack plate $h$ at opposite ends by vertical slides $k$ which are received in vertical guides $k'$ formed in the inner faces of the slides $h^3$. One of the slides $k$ is provided with stud $k^2$ upon which the rear end of the plate $h$ is supported and about which it is free to turn, and the other slide is provided with a stud $k^3$ upon which the forward end of the plate $h$ is supported and about which it is free to turn, and in order to insure that the downward yielding movement at each end of the last shall be the same and thus insure the maintaining of the last in proper position to which it may have been placed by the mechanism hereinbefore described, each slide $k$ is provided with a rack $k^4$ and $k^5$, the rack $k^4$ engaging a pinion $k^6$ carried upon one end of an extensible shaft $k^7$ mounted in suitable bearings $k^8$ and $k^9$ carried by the plates $h^3$. The shaft $k^7$ at its opposite end carries a gear $k^{10}$ which meshes with an intermediate gear $k^{11}$ which in turn meshes with a rack $k^5$ of the slide $k$.

In order to permit the tilting movement of the jack by the reciprocations of the plate $h$ and the rocking of the plates $h^5$ which has been described, the shaft $k^7$ is made of two sections having a sliding movement with relation to each other and is also provided at opposite ends with gimbal joints $k^{12}$.

In order to maintain the slides $k$ in their elevated position each of said slides is connected by means of a rod $k^{13}$ with a suitable spring $k^{14}$ connected at one end to said rods, and at their opposite ends with a fixed support $k^{15}$, said springs acting to normally raise the slides $k$ in their guides $k'$, and in order to limit the upward movement of the slides $k$ I have provided a suitable stop $k^{16}$ fixed to one of the guides $k'$ and arranged to engage the upper edge of one of the slides $k$.

The heel support or the spindle $h^2$ may be arranged to be adjustable longitudinally toward and from the toe support, or vertically in any suitable manner. In the machine of the drawings said spindle $h^2$ is carried by a carriage $l$ arranged to be moved along a guide way $l^2$ in the plate $h$ and fixed at the desired point along said guide way $l^2$ by means of a spring bolt $l^3$ one end of which is arranged to engage suitable notches $l^4$ formed along one side of the guide way $l^2$, and to secure the vertical adjustment of the spindle $h^2$, it is carried by a threaded stem $l^5$ arranged in suitable bearings on the carriage $l$ and engaged by a threaded nut $l^6$ between said bearings.

The operation of the machine is as follows:—Assuming that a rough rounding and channeling machine is supported upon the cross head $a'$ and that upon the jack shown in Fig. 1 of the drawing there is a right last and shoe, and that the swinging jack frame A' has been moved inward and locked by the latch C, with the last in the position shown in Fig. 1, that is with the shoe in position so that the rough rounding and channeling knives begin their operation at the beginning of the shank portion at the outer side of the shoe sole. The operator now places his foot upon the treadle $b^{22}$ thus pulling down the rod $b^{27}$ and the lever $b^{28}$.

which throws out the arm $b^{40}$ and permits the spring $b^{36}$ to slide the sleeve $b^{33}$ along the shaft B to bring the arm $b^{38}$ in engagement with the lug $b^{39}$ of the sprocket wheel $b^{30}$ to thus lock the sprocket wheel to the shaft B, and as the lever $b^{28}$ moves downward it strikes one arm $b^{29}$ of the sleeve $b^{18}$ turning said sleeve on the rod $b^4$ and removing the arm $b^{17}$ from engagement with the lug $b^7$ of the worm gear $b^8$, thus permitting the spring $b^5$ to move the rod $b^4$ to the left to couple the clutch members of the pulley $b$ and the collar $b'$, which will thereupon rotate the shaft B and by means of the sprocket wheel $b^{30}$ and sprocket chains and connecting mechanism which has been described, set in motion the jack operating mechanism. The jack will now be given a longitudinal feeding motion to cause the shoe to travel along to bring all parts of the shank and ball and forepart of the shoe sole beneath the action of the tools, and the jack will at the same time be rocked laterally, about a horizontal axis, swing laterally about a vertical axis and tilted longitudinally to properly position the shoe with relation to the tools by the mechanism and in the manner which has been heretofore particularly described in connection with the description of the form and arrangement of the mechanism. That is, at this time and while the work progresses along the outer shank portion, the jack supporting carriage will move backward along its guides in order to rock the last and shoe laterally to slightly lower the inner shank portion along the inner side which at that time is at a point removed from the tools and thus place the outer shank portion in proper relation to the tools. At this time the last and jack have been tilted longitudinally to lower the toe and raise the heel end of the last and toe whereby the shank portion is placed in a substantially horizontal plane. As the work progresses along the shank portion and nears the ball portion, the toe of the shoe will be still further depressed and the heel raised while the tools are acting along the rise which joins the shank and ball portions of the sole, and as this part of the sole passes the tools, the jack and last will be gradually tilted in the opposite direction to lower the heel and raise the toe as the work proceeds along the forward part of the shoe and until the toe has been turned to bring the inner part of the shoe under the action of the tools. As the work progresses along the inner side of the forepart of the shoe, the toe portion will be gradually lowered and the heel raised until the high part, adjacent the forward part of the shank is reached, at which point the toe is still further lowered and the heel raised and as the shank part is reached the toe will be slightly raised and the heel lowered to place the inner shank part in proper horizontal position. As the shoe was turned at the toe and while the operation was advancing along the inner side of the shoe, the jack supporting carriage was moved outwardly along its guides in order to rock the last laterally to place it and the shoe in proper position for the action of the tools along the inner position of the shoe sole.

While the operations described have been taking place the jack has been swung laterally first one way and then the other to bring the irregular contour of the edge of the shoe sole in proper relation to the tool or tools, and as the toe of the shoe was reached, turned around to bring the opposite side of the last and shoe in position to be operated on by the tools. As the work reaches the end of the shank portion or at a point opposite to the point at which the work was commenced, the stud $c^7$ engages the lever $c^4$ and draws back the latch C releasing the jack frame A' which will then be thrown out by the rods $c^8$, $c^{11}$ and spring $c^{10}$, thus removing the shoe from the tools and while in such position the further operation of the jack mechanism returns the jack and last to their starting position, at which time the dog $b^7$ comes in contact with the arm $b^{17}$ of the sleeve $b^{18}$ moving it to the right, thus moving the rod $b^4$ to the right, disconnecting the pulley $b$ and collar $b'$ stopping the rotation of the shaft B, and also by means of the arm $b^{35}$ moving the sleeve $b^{33}$ to the right to remove the arm $b^{38}$ from engagement with the lug $b^{39}$ of the sprocket wheel $b^{30}$, said sleeve being held in such position by means of the arm $b^{40}$ which is then caused to engage the same by the spring $b^{42}$. The operator now throws in the companion jack actuating mechanism and by means of its treadle and independent clutch connections starts the same in operation, and while the first jack is at rest removes the last and shoe therefrom and replaces it with a new last and shoe preparatory for another operation.

It will of course be understood that two machines will be supported upon the head $a'$, one for each jack, and that each jack, be provided with suitable stop and start motions timed and arranged to act in connection with the operation of the jack mechanism.

I desire to state that the present invention is applicable to many shoe working machines wherein the shoe on the last is presented to the action of various instrumentalities used in their manufacture, and that while I have illustrated diagrammatically a rough rounding and channeling machine, the present invention is not limited thereto, such illustration being merely for the purpose of aiding in securing a clear understanding of the construction, organization and mode of operation of the various instrumentalities incorporated in the present invention. I desire to further state that I do not consider the invention as limited to the specific embodiment thereof set forth in the drawings as the same may be modified in many ways without departing therefrom. I desire to further state that such terms as "horizontal" and "vertical" as used herein are to be taken as applying to the illustrated embodiment of the present invention wherein the jack is arranged to support the shoe with the bottom or sole uppermost, and that such terms will be changed for those appropriate to the changed conditions if it should be desired to construct the machine to support the shoe with its bottom or sole in other positions.

Claims:

1. The combination with an operating tool of a shoe supporting jack, movable to transfer the point of operation of the tool around the shoe, and mechanism operating automatically to impart to the jack lateral rocking movements about a center substantially coincident with the point of operation of the tool as such point is transferred around the shoe, substantially as described.

2. The combination with an operating tool of a shoe supporting jack movable to transfer the point of operation of the tool around the shoe, and mechanism operating automatically to impart to the jack longitudinal tilting movements about a center substantially coincident with the point of operation of the tool as such point is transferred around the shoe, substantially as described.

3. The combination with an operating tool of a shoe supporting jack, movable to transfer the point of operation of the tool around the shoe, and mechanism operating automatically to impart to the jack lateral rocking and longitudinal tilting movements about a center substantially coincident with the point of operation of the tool as such point is transferred around the shoe, substantially as described.

4. The combination with an operating tool of a shoe supporting jack, movable to transfer the point of operation of the tool around the shoe, and mechanism operating automatically to impart to the jack lateral rocking movements about a center substantially coincident with the point of operation of the tool and lateral swinging movements as such point is transferred around the shoe, substantially as described.

5. The combination with an operating tool of a shoe supporting jack, movable to transfer the point of operation of the tool around the shoe, and mechanism operating automatically to impart to the jack longitudinally tilting movements about a center substantially coincident with the point of operation of the tool and lateral swinging movements as such point is transferred around the shoe, substantially as described.

6. The combination with an operating tool, of a shoe supporting jack, movable to transfer the point of operation of the tool around the shoe, and mechanism operating automatically to impart to the jack longitudinally tilting and lateral rocking movements about a center substantially coincident with the point of operation of the tool and lateral swinging movements as such point is transferred around the shoe, substantially as described.

7. The combination with a jack movable to transfer the point of operation of the tool around the shoe, of mechanism operating automatically to impart to said jack longitudinal feeding movements, and mechanism operating automatically to impart to said jack lateral swinging, lateral rocking, and longitudinal tilting movements as the point of operation of the tool is transferred around the shoe, substantially as described.

8. The combination with a jack, of a swinging and turning head supporting said jack, of a sliding carriage supporting the swinging and turning head mounted to move about an axis passing through the point of operation of the tool, and connected mechanism for swinging and turning the head and sliding the carriage, substantially as described.

9. The combination with a tool or tools for operating upon a shoe, of a jack, a movable frame supporting said jack and arranged to move the last and shoe into and out of operative position, a latch arranged to engage the swinging frame and maintain it with the last and shoe in operative position, means to retract the latch to release the swinging frame, a pawl to hold the latch in its retracted position, said pawl being arranged to be tripped to release the latch as the movable frame is advanced to an operative position, substantially as described.

10. The combination with a tool or tools for operating upon a boot or shoe, of a last supporting feeding and positioning jack, a movable frame carrying said jack arranged to move the jack into and out of operative position with relation to the tool or tools, means to maintain the frame and jack in operative position during the action of the tool or tools on the shoe, a power shaft and intermediate connecting mechanisms arranged to actuate said jack to feed and position the last and shoe with relation to the tool or tools, means to release and move the frame and jack out of operative position after the tool or tools have completed their operation upon the shoe, and means to stop the operation of the jack feeding and positioning mechanism after the jack has been returned to its starting position, substantially as described.

11. The combination of an operating tool, of a carriage mounted to move about a center substantially coincident with the point of operation of the tool, a revolving head mounted thereon to move toward and from the tool, a jack mounted to slide longitudinally on said head and mechanism operating automatically to move said carriage, substantially as described.

12. The combination with an operating tool, of a revolving head, a jack mounted to slide longitudinally thereon and to tilt longitudinally about a center substantially coincident with the point of operation of the tool and mechanism operating automatically to tilt the jack, substantially as described.

13. The combination with an operating tool, of a revolving head, a support for a jack mounted to move thereon about a center substantially coincident with the point of operation of the tool, guides carried by said support, a jack mounted to slide in said guides, means for maintaining the guides substantially horizontal during the movements of said support, and mechanism operating automatically to move said support, substantially as described.

14. The combination with an operating tool, of a shoe-supporting jack, and connected mechanism acting automatically to actuate the jack to transfer the point of operation of the tool around the shoe and to impart to the jack lateral rocking movements about a center substantially coincident with the point of operation of the tool as such point is transferred around the shoe, substantially as described.

15. The combination with an operating tool, of a shoe-supporting jack, and connected mechanism acting automatically to actuate the jack to transfer the point of operation of the tool around the shoe and to impart to the jack longitudinal tilting movements about a center substantially coincident with the point of operation of the tool as such point is transferred around the shoe, substantially as described.

16. The combination with an operating tool, of a shoe-supporting jack, and connected mechanism acting automatically to actuate the jack to transfer the point of operation of the tool around the shoe and to impart to the jack lateral rocking and longitudinal tilting movements about a center substantially coincident with the point of operation of the tool as such point is transferred around the shoe, substantially as described.

17. The combination with an operating tool, of a shoe-supporting jack, and connected mechanism acting automatically to actuate the jack to transfer the point of operation of the tool around the shoe and to impart to the jack lateral rocking and lateral swinging movements as the point of operation of the tool is transferred around the shoe, said lateral rocking movements taking place about a center substantially coincident with the point of operation of the tool, substantially as described.

18. The combination with an operating tool, of a shoe-supporting jack, and connected mechanism acting automatically to actuate the jack to transfer the point of operation of the tool around the shoe and to impart to the jack longitudinal tilting and lateral swinging movements as the point of operation of the tool is transferred around the shoe, said longitudinal tilting movements taking place about a center substantially coincident with the point of operation of the tool, substantially as described.

19. The combination with an operating tool, of a shoe-supporting jack, and connected mechanism acting automatically to actuate the jack to transfer the point of operation of the tool around the shoe and to impart to the jack longitudinal tilting, lateral rocking and lateral swinging movements as the point of operation of the tool is transferred around the shoe, said longitudinal tilting and lateral rocking movements taking place about a center substantially coincident with the point of operation of the tool, substantially as described.

20. The combination with an operating tool, of a shoe supporting jack movable to transfer the point of operation of the tool around the shoe, and mechanism operating automatically to move the jack about a center substantially coincident with the point of operation of the tool as such point is transferred around the shoe to bring the sole of the shoe into the desired plane, substantially as described.

21. The combination with an operating tool, of a shoe supporting jack, and connected mechanism acting automatically to actuate the jack to transfer the point of operation of the tool around the shoe and to move the jack about a center substantially coincident with the point of operation of the tool as such point is transferred around the shoe to bring the sole of the shoe into the desired plane, substantially as described.

22. The combination with an operating tool, of a shoe supporting jack movable to transfer the point of operation of the tool around the shoe and also capable of tilting longitudinally as the point of operation of the tool is transferred around the shoe, and means whereby the jack is constrained to move about the point of operation of the tool as a center when tilted longitudinally, substantially as described.

23. The combination with an operating tool, of a shoe supporting jack movable to transfer the point of operation of the tool around the shoe, and also capable of rocking laterally as the point of operation of the tool is transferred around the shoe, and means whereby the jack is constrained to move about the point of operation of the tool as a center when rocked laterally, substantially as described.

24. The combination with an operating tool, of a shoe supporting jack movable to transfer the point of operation of the tool around the shoe, and also movable as the point of operation of the tool is transferred around the shoe to bring the sole of the shoe into the desired plane, and means whereby the jack is constrained to move about the point of operation of the tool as a center when moved to bring the sole of the shoe into the desired plane, substantially as described.

25. The combination with an operating tool, of a jack longitudinally movable and rotatable to transfer the point of operation of the tool around the shoe, and mechanism acting automatically to tip the jack longitudinally and rock it laterally to maintain the portion of the sole surface in proximity to the tool in substantially the same plane as the point of operation of the tool is transferred around the shoe, substantially as described.

26. The combination with an operating tool, of a shoe supporting jack longitudinally movable and rotatable, and connected mechanism acting automatically to actuate the jack to transfer the point of operation of the tool around the shoe, and to tip the jack longitudinally and rock it laterally to maintain the portion of the sole surface in proximity to the tool in substantially the same plane as the point of operation of the tool is transferred around the shoe, substantially as described.

27. The combination with an operating tool of a shoe supporting jack movable to transfer the point of operation of the tool around the shoe, and mechanism operating automatically and independently of the movement of the jack in transferring the point of operation of the tool around the shoe to impart to the jack lateral swinging movements to maintain the portion of the edge of the last or shoe sole in proximity to the tool parallel with the line of feed as the point of operation of the tool is transferred around the shoe, substantially as described.

28. The combination with an operating tool of a jack longitudinally movable and rotatable to transfer the point of operation of the tool around the shoe, mechanism acting automatically to actuate the jack to maintain the portion of the sole in proximity to the tool in substantially the same plane as the point of operation of the tool is transferred around the shoe, and means operating independently of the longitudinal movements of the jack for driving said mechanism, substantially as described.

29. The combination with an operating tool of a jack longitudinally movable and rotatable to transfer the point of operation of the tool around the shoe, and mechanism including a cam and movable connections between the cam and the jack operating automatically to maintain the portion of the sole surface in proximity to the tool in substantially the same plane as the point of operation of the tool is transferred around the shoe, substantially as described.

30. The combination with an operating tool of a jack longitudinally movable and rotatable to transfer the point of operation of the tool around the shoe, mechanism acting automatically to impart longitudinal tipping movements to the jack as the point of operation of the tool is transferred around the shoe, and means other than the jack to drive said mechanism, substantially as described.

31. The combination with an operating tool, of a shoe supporting jack freely movable laterally toward and from the tool to maintain the edge of the last or shoe sole in proximity to the tool, and mechanism acting automatically and independently of the movement of the jack toward and from the tool to tip the jack longitudinally and rock it laterally to maintain the portion of the sole surface in proximity to the tool in substantially the same plane, substantially as described.

32. The combination with an operating tool of a shoe supporting jack longitudinally movable and rotatable to transfer the point of operation of the tool around the shoe, and also capable of tilting longitudinally as the point of operation of the tool is transferred around the shoe, and means whereby the jack is constrained to move about the point of operation of the tool as a center when tilted longitudinally, substantially as described.

33. The combination with an operating tool of a shoe supporting jack longitudinally movable and rotatable to transfer the point of operation of the tool around the shoe, and also capable of rocking laterally as the point of operation of the tool is transferred around the shoe, and means whereby the jack is constrained to move about the point of operation of the tool as a center when rocked laterally, substantially as described.

34. The combination with an operating tool of a shoe supporting jack longitudinally movable and rotatable to transfer the point of operation of the tool around the shoe, and also movable as the point of operation of the tool is transferred around the shoe to bring the sole of the shoe into the desired plane, and means whereby the jack is constrained to move about the point of operation of the tool as a center when moved to bring the sole of the shoe into the desired plane, substantially as described.

In testimony whereof I affix my signature, in presence of two witnesses.

ERASTUS E. WINKLEY.

Witnesses:
F. HART ANDERSON,
HORACE VAN EVEREN.